Feb. 16, 1954

P. A. LUPPEN 2,669,034

RECORDING METHOD

Filed July 30, 1949

INVENTOR.
PETER A. LUPPEN
BY
James B. Christie
ATTORNEY

Patented Feb. 16, 1954

2,669,034

UNITED STATES PATENT OFFICE 2,669,034

RECORDING METHOD

Peter A. Luppen, Bakersfield, Calif.

Application July 30, 1949, Serial No. 107,760

18 Claims. (Cl. 35—48)

This invention relates to a method of recording and more particularly to a recording method by means of which a visual comparison of the recorded data is obtained in the form of a compact and substantially permanent record. The invention finds application in the fields of statistical analysis, abstracting, sorting, comparison, etc.

The method of the invention can best be presented by describing it in relation to a single application from which its many other applications will be apparent. The field of comparative or statistical analysis is of such major significance in business, economics, education, scientific research, that the invention is described with relation to its use therein. There are many situations in which it is necessary or desirable to compare a given individual item of intelligence or a given series of individual items of intelligence with a group of items of intelligence of like nature. For example, comparison is often made between the grades of a single school student with the grades in the same subject or subjects of an entire class of students. Or in business, it is common to compare period by period achievements of one salesman against the achievements of a group of salesmen in the same period or periods.

Heretofore such comparisons have involved numerical or tabular analysis wherein for example, the percentile grades of one student are compared with the grades of a group of students in the same subjects. The method of the invention provides a simple means of obtaining a visual or permanent record of such a comparison which does not involve the use of tables or comparative figures.

The invention contemplates a method of differential recording for comparing a single item or series of items of intelligence with a number of items of intelligence which number of items may or may not include the single item, which comprises graphing as a separate graph, each of the items of intelligence, photographing each graph to obtain a photographic negative thereof, exposing each of the several negatives on a single print to obtain a composite reproduction of said intelligence, photographing said composite print to obtain a photographic negative of said composite, exposing the negative representing the single item of intelligence or series of items of intelligence to obtain a print thereof and exposing the negative of the composite intelligence on the same print to superimpose the composite intelligence on the single item of intelligence.

The invention may be more clearly understood by reference to the following detailed description taken with the accompanying drawing in which.

Figure 1:
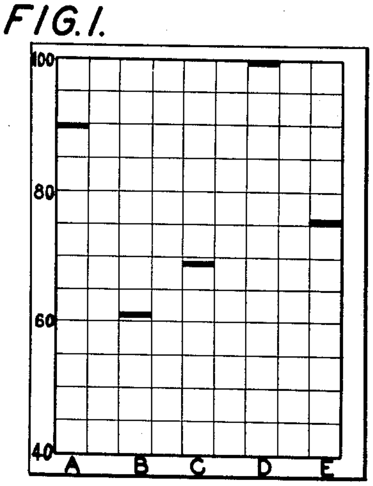
Fig. 1 illustrates a graph of individual achievement in a number of fields.
Figure 2:
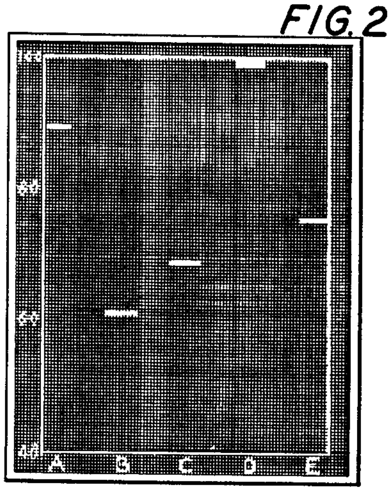
Fig. 2 shows the negative obtained by photographing the graph of Fig. 1.

The invention is illustrated and will be described in relation to its application in the comparison of records of one student against the records of a plurality of students in a number of different subjects of study designated for convenience, subjects A, B, C, D and E. Fig. 1 shows a graph of the grades obtained by a single student in these subjects. For example the student whose achievements are graphed in Fig. 1 achieved a 90% average in subject A, a 61% average in subject B, a 69% average in subject C and so forth. In preparing the graph or chart of Fig. 1, a single bar is drawn at the appropriate percentile level vertically above the subject represented by the bar. Conveniently a cross hatched graph paper having percentile indices arranged along the abscissa with the subjects delineated along the ordinate is used. In the practice of the method, a plurality of graphs of the type shown in Fig. 1 are made, a separate graph for each of the several students included within the comparison. Thereafter each of the graphs is photographed preferably on microfilm to obtain a series of negatives. Fig. 2 shows the negative of the graph of Fig. 1 wherein the black bars on the graph of Fig. 1 show up as white bars on a black background in the negative.

Figure 3:
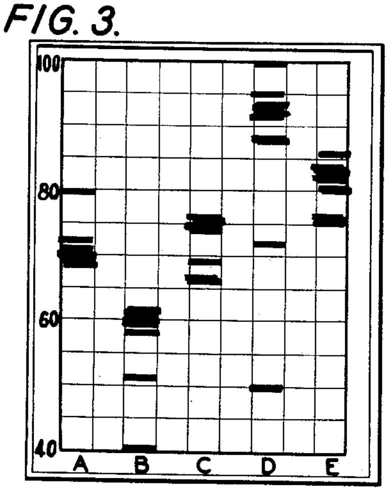
Fig. 3 is a print obtained by successive exposure of a number of negatives of the type shown in Fig. 2.

The entire group of negatives representing the individual statistics of the sum total of students entering into the comparison are printed on a single print as illustrated in Fig. 3. The print of Fig. 3 hence represents a composite record of the grades obtained by the several students in the courses listed. However, in the print of Fig. 3, there is no means of comparing the grades of one student against the other since they all appear on the print in equal intensity.

Figure 4:
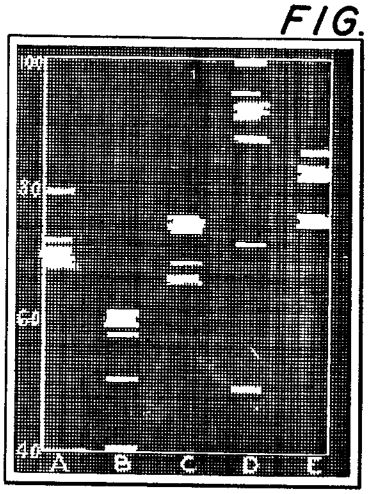
Fig. 4 is a negative obtained by photographing the composite print of Fig. 3.

The next step in carrying out the method of the invention comprises photographing the print of Fig. 3 to obtain a composite negative as illustrated in Fig. 4 wherein the plurality of bars representing the grades of the several students in each of courses A, B, C, D and E appear as white bars on a black background. At this stage in the practice of the method there exists a separate negative of the type shown in Fig. 2 of the record of each of the several students and a single composite negative of the type shown in Fig. 4 representing the composite of all of the data shown on the several separate negatives.

Figure 5:
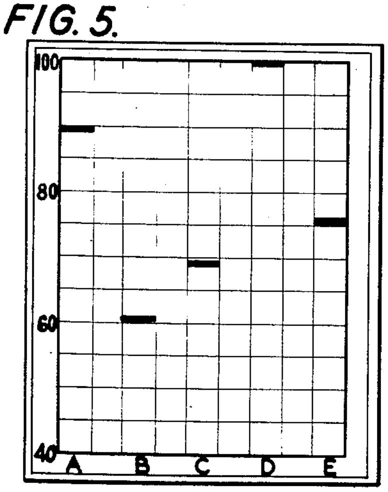
Fig. 5 is a print of the negative of Fig. 2.
Figure 6:
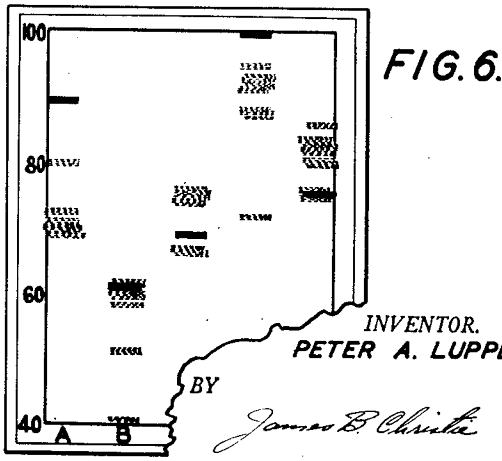
Fig. 6 is the print of Fig. 5 having superimposed thereon a print of the negative of Fig. 4.

To obtain a visual comparison of the record of the student whose graph is shown in Fig. 1 with the composite record of all of the other students, the following procedure is employed. The negative of Fig. 2 is printed to obtain a print as shown in Fig. 5 which is in effect an exact reproduction of the graph of Fig. 1. Before the print of Fig. 5 is fixed the negative of Fig. 4 i. e. the composite negative is printed thereon superimposing over the reproduction of the record of a single student the records of the entire group of students. In printing the negative of Fig. 4 on the print of Fig. 5 the print is under exposed so that the record of the single student first printed on the print will stand out more clearly and distinctly than the print of the composite negative. A final print of the type shown in Fig. 6 is obtained wherein it is seen that the heavy dark bars correspond with the graph of Fig. 1 and the lighter cluster bars represent the composite record of all of the students in the group. It is immediately apparent from examination of the print of Fig. 6 that the particular student under investigation is appreciably above average in course A, is a little above average in course B, is a little below average in course C, is above average in course D and is a little below average in course E.

In the course of preparing the final comparison print of Fig. 6 the percentile and subject indices will be obscured as a result of the multiple exposure of the print. So that these indices will appear clearly on the print, the final print may be made on photographic paper on which the indices have been reprinted. Alternatively, a negative of the indices only may be printed on the print either before or after the other data.

A complete comparison may be made by separately printing each of the several negatives of the type shown in Fig. 2 which represent the records of the several individual students and superimposing on each of the several prints a composite as obtained from the negative of Fig. 4. In this manner, if the records of ten students are being compared, one will obtain ten prints of the type shown in Fig. 6 in each of which a different set of bars will be predominant.

As an alternative procedure, the composite print (Fig. 3) may be photostated to give a white portrayal of data on a black background. The negative obtained by photographing the photostat will then be the reverse of the negative of Fig. 4, i. e., it will have a white background with black bands thereon. When the reverse negative is printed on the print of Fig. 5, it will impart to the print a gray background on which the composite bands will be white and the individual bands (see Fig. 5) will be black. Either of these procedures produces the same end result but the procedure first described and illustrated is preferred since it involves fewer steps and the final record is more attractive and intelligible.

From the foregoing description, it is obvious that the recording method of the invention may be used in a large number of fields and that the individual record compared with the combined records of a plurality of individuals may actually represent a group record compared with a plurality of groups. As an example, it may be desirable to compare the average grades obtained in a given school in a number of subjects with the average grades obtained in a large number of schools of the same type. In such event the graph of Fig. 1, instead of representing the grades of a single student will represent the average grades in each of the courses designated of all of the students in a given school.

Furthermore the invention is not limited to comparative recording of grade averages. Substantially any type of data may be recorded in this manner as for example, in referring to Fig. 1, assume that the numerical indices along the abscissa represent the number of sales that a given salesman has made in the separate periods, the periods being represented by the indices A, B, C, D and E delineated along the ordinant. Upon this assumption and by carrying out the method, the print of Fig. 6 will represent a comparison of the sales records of the individual salesman as against the composite record of all of the salesmen.

In addition to providing a ready comparison of individual records to group records the method has an advantage of providing for the recording of bulky records as useable permanent records of minimum bulk which can be used and added to for easy reference and abstracting. Additionally, by using the microfilm to obtain an opaque background as illustrated in Figs. 2 and 4, the method finds applications in classification work. Conventional classification machines employ a punched card wherein the spacing and location of the punches in the card indicate various data which differ from that in other cards and which may be picked out from such other cards by reason of the difference in spacing and location of said punch mark. In the present method, the microfilm may be used in the same manner wherein the film is perforated with repect to light. Since the patterns on the various films may be varied in accordance with any desired plan, an easy method of sorting and abstracting is achieved by scanning the separate films with photoelectric means wherein the photoelectric scanning means may be pre-set to select from a large number of films a single film or a group of films having a particular light transparency pattern.

Another features of the invention involves the relative density of silver deposit on the prints of Fig. 3 or Fig. 6. By examining the composite prints with a conventional densitometer, that is, with an instrument capable of determining the thickness of silver deposit on the film, statistical studies can be made. In this latter application the densitometer is used to obtain, for example, the point of maximum silver density which in the illustration described with reference to the drawing, would mean the median grade of the students in each of the designated courses. I have described a recording method which involves a number of separate steps to arrive at a definite type of record which has many uses apart from the more obvious use of visual comparison. The invention contemplates within its scope any use of the method or any use of component parts of the method. For example, and as described above, if the method is to be used in photoelectric sorting, it need not be carried past the second or possibly the fourth steps, i. e., there would be no need of obtaining the prints as shown in Figs. 5 and 6. However, such photoelectric sorting is included within the scope of the invention. Many other uses of the method of the invention will occur to those skilled in the art without departing from the scope thereof as described and claimed.

I claim:

1. A recording method for comparing individual records which comprises graphing as a separate graph each of the individual records, photographing each graph to obtain a negative thereof, exposing each of the several negatives on a single print to obtain a composite print of all of said data, photographing said composite print to obtain a composite negative thereof, and presenting the negative of an individual record with the composite negative in a contrasting manner to permit visual comparison.

2. A recording method for comparing individual records with group records consisting of a plurality of individual records which comprises graphing as a separate graph each of the individual records, photographing each graph to obtain a negative thereof, exposing each of the several negatives on a single print to obtain a composite print representing said group records, photographing said composite print to obtain a composite negative thereof, printing a negative representing individual records to obtain a relatively dark print thereof and printing said composite negative on the print of said individual records to superimpose a relatively light print of the composite records on the individual records.

3. A recording method for comparing individual records with group records consisting of a plurality of individual records which comprises graphing as a separate graph each of the individual records, microfilming each of the separate graphs, exposing each of the several microfilms on a single print to obtain a composite print representing said group records, microfilming said composite print to obtain a composite film thereof, printing a film representing individual records to obtain a print thereof, and printing said composite film on the print of said individual records to superimpose the group records on the individual records the film representing individual records and the composite film being printed to different intensities.

4. A method according to claim 3 wherein said composite film is underexposed when printed on said print of said individual records so that the individual records will be more dstinct than the group records.

5. A recording method for comparing individual records with group records consisting of a plurality of individual records which comprises graphing as a separate graph each of the individual records, photographing each graph to obtain a negative thereof, exposing each of the several negatives on a single print to obtain a composite print representing said group records, photostating said composite print to obtain a photostatic negative, photographing said photostatic negative to obtain a photographic composite negative, printing a negative representing individual records to obtain a print thereof, and printing said photographic composite negative on the print of said individual records to superimpose the group records on the individual records.

6. A method according to claim 5 wherein the various photographs are made on microfilm whereby the graphs appear on the photographic negatives as transparent bands on an opaque background.

7. A recording method for comparing individual records with group records consisting of a plurality of individual records which comprises graphing as a separate graph each of the individual records, each graph having identical indices along the ordinate and abscissa, photographing each graph to obtain a negative thereof, exposing each of the several negatives on a single print to obtain a composite print representing said group records, photographing said composite print to obtain a composite negative, printing one of the negatives of individual records to obtain a print thereof and printing said composite negative to a different intensity on the same print to obtain a comparison print of the group records and said one of said individual records, the said print having delineated thereon the indices appearing on the ordinate and abscissa of each of said graphs.

8. A method according to claim 7 wherein the said indices are delineated on said comparison print by printing the same thereon from a photographic negative displaying only said indices.

9. A method according to claim 7 wherein the same indices are printed on said composite print before any of said negatives are printed thereon.

10. A recording method for comparing individual records with group records consisting of a plurality of such individual records which comprises graphing as a separate graph each of the individual records, photographing each of the separate graphs to obtain a negative of each, exposing each of the several negatives on a single print to obtain a composite print representing said group records, photographing said composite print to obtain a composite negative, printing a negative of individual records to obtain a print thereof, printing said composite negative to a different intensity on the print of said individual records to obtain a final print wherein the composite record is superimposed on the individual records, and determining the point of maximum silver deposit on each record of said final print to determine the median thereof.

11. A recording method for comparing individual records which comprises perforating a first opaque medium in a pattern symbolic of certain of said records, perforating a second opaque medium in a pattern symbolic of at least one of said records, and transposing a reproduction of each of the perforated opaque media on a third medium and in a contrasting manner.

12. A recording method for comparing individual records which comprises photographing each of said records to obtain separate photographic negatives representative thereof, and printing the several negatives on a single print with at least one negative being printed to a different intensity whereby the record represented by said negatives may be visually compared with the records represented by the others of said negatives.

13. A method differential recording for comparing less than all of a group of distinct items of intelligence with a group which comprises perforating a separate medium for each distinct item of intelligence, transposing a reproduction of the separate media on a single medium and transposing a reproduction of less than all of said perforated media on said single medium in a contrasting manner.

14. A recording method for comparing individual records with group records consisting of a plurality of individual records which comprises perforating a separate opaque medium for each individual record, the perforations in each instance being oriented on the medium according to a symbolic pattern to impact common meaning to all of the records, reproducing an image of the several individual perforated media on a single medium to form a composite record of the same symbolic pattern, and reproducing in a contrasting manner an image of less than all of the perforated media on said single medium.

15. A method according to claim 14 wherein the several individual media are differently registered with the said single medium so that the reproductions of the individual media will not be superimposed on the single medium.

16. A recording method for comparing individual records with group records consisting of a plurality of individual records which comprises perforating an opaque medium in a symbolic pattern to form a composite record based upon spatial separation of the perforations thereon, perforating a similar opaque medium in a like symbolic pattern for an individual record, and transposing a reproduction of both the composite and the individual perforated records on a single medium in a contrasting manner.

17. A method according to claim 16 wherein the composite and individual perforated records are maintained in the same registry with said single medium in the reproduction thereof so that the individual record will be superimposed over the composite records as reproduced.

18. A recording method for comparing individual records which comprises perforating a first opaque medium with respect to light in a pattern symbolic of certain of said records, perforating a second opaque medium with respect to light in a pattern symbolic of at least one of said records, and transposing a reproduction of each of the perforated opaque media on a third medium and in a contrasting manner.

PETER A. LUPPEN.

References Cited in the file of this patent

UNITED STATES PATENTS

| Number | Name | Date |
|---|---|---|
| 1,815,251 | Goldman | July 21, 1931 |
| 1,866,866 | Sutcliffe | July 12, 1932 |
| 2,068,226 | Buck | Jan. 19, 1937 |
| 2,183,524 | Yule | Dec. 19, 1939 |
| 2,203,000 | Smith | June 4, 1940 |
| 2,206,206 | Smith | July 2, 1940 |
| 2,232,144 | Sersen | Feb. 18, 1941 |
| 2,269,161 | Morse | Jan. 6, 1942 |
| 2,291,683 | Boothe | Aug. 4, 1942 |
| 2,309,390 | Grossguth et al. | Jan. 26, 1943 |
| 2,352,413 | Schuch et al. | June 27, 1944 |
| 2,474,828 | Connelly et al. | July 5, 1949 |